United States Patent
Kitaura (10) Patent No.: US 8,475,094 B2
(45) Date of Patent: Jul. 2, 2013

(54) FIXING STRUCTURE OF SPINDLE BALANCER FOR MACHINE TOOL TECHNICAL FIELD

(75) Inventor: Ichiro Kitaura, Hyogo (JP)

(73) Assignee: Pascal Engineering Corporation, Hyogo (JP)

( * ) Notice: Subject to any disclaimer, the term of this patent is extended or adjusted under 35 U.S.C. 154(b) by 1144 days.

(21) Appl. No.: 12/310,253

(22) PCT Filed: Aug. 25, 2006

(86) PCT No.: PCT/JP2006/316691
§ 371 (c)(1),
(2), (4) Date: Feb. 19, 2009

(87) PCT Pub. No.: WO2008/023428
PCT Pub. Date: Feb. 28, 2008

(65) Prior Publication Data
US 2009/0278291 A1    Nov. 12, 2009

(51) Int. Cl.
*B23Q 1/70* (2006.01)
*B23B 47/26* (2006.01)

(52) U.S. Cl.
USPC .......................... 409/238; 409/239; 409/235

(58) Field of Classification Search
USPC ........................................ 409/233, 237–239
IPC ................ B23Q 1/38,1/70; B23B 19/00, 19/02
See application file for complete search history.

(56) References Cited

U.S. PATENT DOCUMENTS
6,883,789 B2 *  4/2005  Kimura ......................... 409/237

FOREIGN PATENT DOCUMENTS

| | | | |
|---|---|---|---|
| JP | 1-210207 | | 8/1989 |
| JP | 11129101 A | * | 5/1999 |
| JP | 2001-105256 | | 4/2001 |
| JP | 2001-334433 | | 12/2001 |
| JP | 2002-254265 | | 9/2002 |
| JP | 2003-080440 | | 3/2003 |

* cited by examiner

*Primary Examiner* — Dana Ross
*Assistant Examiner* — Pradeep C Battula
(74) *Attorney, Agent, or Firm* — Jordan and Hamburg LLP (57) ABSTRACT

A fixing structure of a spindle balancer for a machine tool is described as having a flange member having a supported surface and provided fixedly to a cylinder body of a gas spring, a supporting member having a flange receiving surface and a fixing hole, and secured to the spindle head of a machine tool, and a plurality of fastening members for fastening the flange member to the supporting member so as to allow the supported surface of the flange member to abut against the flange receiving surface of the support member.

3 Claims, 5 Drawing Sheets

FIXING STRUCTURE OF SPINDLE BALANCER FOR MACHINE TOOL TECHNICAL FIELD

TECHNICAL FIELD

The present invention relates to a fixing structure of spindle balancer for machine tool for mounting a spindle balancer having a gas spring on a machine tool vertically.

BACKGROUND TECHNOLOGY

In the prior art, the applicant of the present application put into practical use a spindle balancer having a gas spring biasing the vertically movable spindle head of a machine tool upward (for example see Patent Document 1). The gas spring of the spindle balancer has a cylinder body, compressed gas introduced in the cylinder body, and a rod inserted in the cylinder body to receive the gas pressure of the compressed gas.

The spindle balancer having a gas spring is generally mounted on a machine tool vertically and, in such a case, the cylinder body is coupled to one of the spindle head and base of the machine tool and the rod is coupled to the other of the spindle head and base of the machine tool.

Patent Document 1: Japanese Laid-Open Patent Publication No. 2001-105256.

DISCLOSURE OF THE INVENTION

Problems to be Solved by the Invention

In the prior art, fixing structure of spindle balancer for machine tool for mounting a spindle balancer having a gas spring on a machine tool vertically, when the cylinder body is coupled to the machine tool (the spindle head or the base) via conventional cylinder brackets, the spindle balancer is increased in weight and size, whereby it is difficult for the spindle balancer to be supported on a machine tool in a stable and secure manner and mounted properly in position and orientation in a simple and secure manner.

Therefore, the workload of mounting the spindle balancer on a machine tool is large and there are some safety issues during the mounting, hence increasing the mounting time. Furthermore, compressed gas is introduced in the cylinder body after the spindle balancer is mounted and the pressure of the compressed gas is adjusted for setting up the spindle balancer. This setup operation of the spindle balancer is not easy because the spindle balancer is not supported on the machine tool in a stable and secure manner, therefore increasing the setup time.

The setup operation of the machine tool spindle balancer is done with the rod being inserted in the cylinder body by a specific amount. After the setup operation, the gas spring holds a powerful biasing force. If the cylinder body is decoupled from the machine tool in this state, the gas spring abruptly extends, which is not a favorable event. Such a contingent event may occur when the operator decouples the cylinder body from the machine tool by mistake after setting up the spindle balancer. A precaution to prevent this event is important for increased safety.

The purpose of the present invention is to provide a fixing structure of spindle balancer for machine tool that allows a spindle balancer having a gas spring to be supported on a machine tool in a stable and secure manner and mounted properly in position and orientation in a simple and secure manner, then reducing the workload of mounting the spindle balancer on a machine tool, increasing the safety during the mounting, facilitating the setup operation including introduction of compressed gas into the cylinder body and adjustment of the gas pressure after the spindle balancer is mounted, saving the mounting time and setup time of the spindle balancer, and increasing the safety after the setup.

Means to Solve the Problem

The fixing structure of spindle balancer for machine tool according to the present invention is a fixing structure of spindle balancer for machine tool for mounting on a machine tool vertically a spindle balancer comprising a gas spring having a cylinder body, compressed gas introduced in the cylinder body, and a rod inserted in the cylinder body to receive gas pressure of the compressed gas and biasing vertically movable spindle head of the machine tool upward, characterized by comprising a flange member fixed to the cylinder body of the gas spring so as to extend horizontally outward from the cylinder body and having a flat supported surface on an underside; a support member fixed to the spindle head or base of the machine tool and having on a top surface a flange receiving surface for receiving the supported surface and a mounting hole in which the cylinder body is fitted in part so that the supported surface abuts against the flange receiving surface; and plural fastening members for fastening the flange member to the support member so that the supported surface abuts against the flange receiving surface.

In the above fixing structure of spindle balancer for machine tool, the gas spring of a spindle balancer to be mounted can be a gas spring positioned with the rod protruding downward from the cylinder body, a gas spring positioned with the rod protruding upward from the cylinder body, or a gas spring positioned with the rod protruding both downward and upward from the cylinder body. The flange is preferably provided at the lower end or at the upper end. However, the flange can be provided in the middle of the cylinder body in the longitudinal direction other than the lower or upper end.

The cylinder body usually has a barrel and end walls fixed to the barrel at the upper and lower ends. When the flange member is provided at the lower or upper end of the cylinder body, it is preferable that the flange member is integrally formed with or fixed to the end wall of the cylinder body. However, the flange member can be fixed to the barrel of the cylinder body including such a case that the flange member is provided in the middle of the cylinder body in the longitudinal direction.

When the spindle balancer is positioned with the rod protruding downward from the cylinder body and the flange member is provided at the lower end of the cylinder body, the lower end part of the cylinder body protrudes downward from the flange member and is fitted in the mounting hole of the support member from above. In such a case, it is preferable that the lower end of the cylinder body does not protrude downward from the mounting hole.

Another aspect of the present invention is characterized in that the support member has plural head housing holes in which plural heads of plural fastening members are fitted, respectively, and the fixing structure further comprises a cover plate attached to an underside of the support member for covering plural heads of the plural fastening members and having a through-hole in which the rod or cylinder body is inserted and plural fixtures for fixing the cover plate to the support member.

In another possible structure, the flange member has plural head housing holes in which plural heads of plural fastening members are fitted, respectively, and the fixing structure further comprises a cover plate attached to the top surface of the flange member for covering plural heads of the plural fastening members and having a through-hole, in which the rod or cylinder body is inserted and plural fixtures for fixing the cover plate to the flange.

The other aspect of the present invention is characterized in that the compressed gas can be introduced in the cylinder body while the rod of the gas spring is inserted in the cylinder body by a specific amount after the flange member is fastened to the support member.

Advantages of the Invention

According to the present invention, a flange member is fixed to the cylinder body of the gas spring so as to protrude horizontally outward from the cylinder body and the flange member has a flat supported surface on the underside while a support member is fixed to the vertically movable spindle head or base of a machine tool and the support member has on the top surface a flange receiving surface for receiving the supported surface of the flange. The flange member has a mounting hole in which the cylinder body is fitted in part so that the supported surface abuts against the flange receiving surface, and plural fastening members for fastening the flange member to the support member so that the supported surface of the flange member abuts against the flange receiving surface of the support member are provided. Hence, the spindle balancer can be supported on a machine tool in a stable and secure manner and mounted properly in position and orientation in a simple and secure manner, then, reducing the workload of mounting the spindle balancer on a machine tool, increasing the safety during the mounting, facilitating the setup operation including introduction of compressed gas in the cylinder body and adjustment of the gas pressure after the spindle balancer is mounted, and saving the mounting time and setup time of the spindle balancer.

According to another aspect of the present invention, the support member has plural head housing holes in which plural heads of plural fastening members are fitted, respectively, so that there is no interference between plural fastening members and cover plate when the cover plate is attached to the underside of the support member and the cover plate has a through-hole in which the rod or cylinder body is inserted so that there is no interference between the cove plate and rod or cylinder body, whereby the cover plate can be attached to underside of the support member and securely fixed to the support member by plural fixtures and plural heads of the fastening members can securely be covered with the cover plate. When the operator loosens plural fastening members by mistake while the rod does not completely protrude from the cylinder body after the spindle balancer is set up, the flange member may be decoupled from the support member and the gas spring may abruptly extend. Such an event can be prevented, increasing the safety.

According to the other aspect of the present invention, compressed gas can be introduced in the cylinder body with the rod of the gas spring being inserted in the cylinder body by a specific amount after the flange member is fastened to the support member. Therefore, the gas spring having a rod of which the reciprocating stroke with regard to the cylinder body is nearly equal to the vertical stroke of the spindle head can be used to ensure the balancer function on the machine tool. The mounting of the gas spring (spindle balancer) on the machine tool and following setup operation can reliably performed and the safety after the setup can be ensured based on another aspect of the present invention.

DESCRIPTION OF NUMERALS 1, 1A to 1C fixing structure of spindle balancer for machine tool
B, BA to BC spindle balancer
2, 2A to 2C gas spring
10, 10A to 10C cylinder body
19 compressed gas
20, 20A to 20C rod
30, 30A to 30C flange member
30a supported surface
40, 40A to 40C support member
40b flange receiving surface
40c mounting hole
40e head housing hole
45, 45A to 45C fastening member
45a head
50, 50A to 50C cover plate
50a, 50Aa, 50Ba through-hole
55 fixture

BEST MODE FOR IMPLEMENTING THE INVENTION

The fixing structure of spindle balancer for machine tool of the present invention is provided with a flange member fixed to the cylinder body of a gas spring so as to extend a rod horizontally outward from the cylinder body and having a flat supported surface on the underside; a support member fixed to the vertically movable spindle head or base of a machine tool and having on the top surface a flange receiving surface for receiving the supported surface of the flange member and a mounting hole in which the cylinder body is fitted in part so that the supported surface abuts against the flange receiving surface; and plural fastening members for fastening the flange member to the support member so that the supported surface of the flange member abuts against the flange receiving surface of the support member.

Embodiment 1

As shown in FIGS. 1 to 4, a fixing structure 1 of spindle balancer for machine tool of Embodiment 1 is designed to mount the gas spring 2 of a spindle balancer B with the rod 20 protruding downward from the cylinder body 10. The lower end of the cylinder body 10 is coupled to the vertically movable spindle head Ma (spindle unit) of a machine tool M and the lower end of the rod 20 abuts against and is pressed against the top surface of a pad Mc fixed to the base Mb of the machine tool M.

First, the gas spring 2 of the spindle balancer B will be described.

As shown in FIGS. 1 to 4, the gas spring 2 comprises a cylinder body 10, compressed gas 19 (for example compressed nitrogen gas 19) introduced in the cylinder body 10, a rod 20 inserted in the cylinder body 10 to receive the gas pressure of the compressed gas 19 and protruding downward from the cylinder body 10, and a flange member 30 extending horizontally outward at the lower end of the cylinder body 10.

The cylinder body 10 has a barrel 11, a rod-side end wall 12 fixed to the lower end of the barrel 11, and a head-side end wall 13 fixed to the upper end of the barrel 11. The rod-side end wall 12 has an outer barrel 14 and a rod insert member 15. The upper end of the outer barrel 14 is fitted in the lower end of the barrel 11 and they are welded together. A flange member 30 is integrally formed at the lower part of the outer barrel 14.

The rod insert member 15 has a small-diameter part 15a at the upper half and a large-diameter part 15b at the lower half. The small-diameter part 15a is fitted in the outer barrel 14 and the large-diameter part 15b is fastened to the outer barrel 14 by plural bolts 16 with the top surface of the large-diameter part 15b abutting against the underside of the outer barrel 14. The plural bolts 16 are inserted into the large-diameter part 15b from bottom and screwed to the outer barrel 14. The underside of the large-diameter part 15b is raised at the periphery compared to the center part. The heads 16a of the plural bolts 16 rest on the raised part, whereby the heads 16a is at a level higher than the center part of the underside of the large-diameter part 15b.

The rod 20 is vertically inserted and slidable in a through-hole 15c of the rod insert member 15. A retaining member 21 is fixed to the upper end of the rod 20 inside the cylinder body 10 (barrel 11). A cylindrical low friction member 22, sealing rings 23 and 24, a cylindrical low friction member 25, and a dust sealing ring 26 are provided on the inner periphery of the through-hole 15c of the rod insert member 15 from top down.

The flange member 30 is integrally formed around the outer barrel 14 of the rod-side end wall 12 of the cylinder body 10 and has a flat supported surface 30a on the underside. The flange member 30 has plural (for example six) vertical bolt thorough-holes 30b and, on the periphery, two vertical cutout surfaces 30c symmetric about the axis.

Here, a lubricant supply structure 35 for supplying lubricant to the sealing member 24, 23 from outside is provided. The lubricant supply structure 35 has a passage 35a formed in the outer barrel 14 of the rod-side end wall 12 from the periphery of the flange member 30, a passage 35b formed in the rod insert member 15, oil-tightly connected to the passage 35a by a seal 35c, and leading to the sealing member 24, 23, and a plug 35d (or a check valve) detachably fitted and screwed in the flange member 30 from outside at the outer end of the passage 35a Here, the gas spring 2 having a rod 20 of which the reciprocating stroke with regard to the cylinder body 10 is nearly equal to the vertical stroke of the spindle head Ma can be used to ensure the balancer function on the machine tool M.

The fixing structure 1 of spindle balancer for machine tool will be described hereafter.

As shown in FIGS. 1 to 4, the fixing structure 1 has the flange member 30, support member 40, plural (for example six) fastening members or bolts 45, a cover plate 50, and plural (for example four) fixtures or screws 55.

The support member 40 is in the shape of a rectangular larger than the flange member 30 in a plane view and in the shape of a block having a vertical length nearly the same as the lower end part of the cylinder body 10 that protrudes downward from the flange member 30. The support member 40 has a flange 40a extending along one side on both sides in the horizontal direction. The flange 40a is fixed to the spindle head Ma of the machine tool M by plural bolts 41.

Here, a key member 43 is fixed to the above one side of the support member 40 by bolts 44. When the support member 40 is fixed to the spindle head Ma, the key member 43 is engaged with the spindle head Ma, whereby the support member 40 is easily positioned on the spindle head Ma and the load from the support member 40 can securely be supported by the spindle head Ma.

The support member 40 has on the top surface a flat horizontal flange receiving surface 40b for receiving the supported surface 30a of the flange member 30. The support member 40 also has a vertical mounting through-hole 40c in which the lower end part of the cylinder 10 (the lower part of the rod insert member 15 of the rod-side end wall 12) is fitted so that the supported surface 30a abuts against the flange receiving surface 40b, plural (for example six) vertical bolt through-holes 40d, and plural (for example six) head housing holes 40e formed at the lower ends of the plural bolt through-holes 40d, respectively.

After the lower end part of the cylinder body 10 is fitted in the mounting hole 40c of the support member 40 and the supported surface 30 of the flange member 30 abuts against the flange receiving surface 40a of the support member 40, the plural bolt holes 30b of the flange member 30 and the plural bolt through-holes 40d of the support member 40 are aligned and plural fastening members 45 are inserted in the bolt through-holes 40d from below and screwed into the bolt holes 30b, whereby the flange member 30 is fastened to the support member 40 with the heads 45a of the fastening members 45 being fitted and housed in the head housing holes 40e.

The cover plate 50 is in the shape of a rectangular nearly the same size as the support member 40 in the bottom view and has a through-hole 50a having a diameter slightly larger than the rod 20 in the center. The cover plate 50 is attached to the underside of the support member 40 to cover the heads 45a of the plural fastening members 45 from below. In this state, the rod 20 is inserted in the through-hole 50a and fixed to the support member 40 by plural fixtures 55.

Here, as described above, the gas spring 2 having a rod 20 of which the reciprocating stroke with regard to the cylinder body 10 is nearly equal to the vertical stroke of the spindle head Ma is used. The compressed gas 19 can be introduced in the cylinder body 10 with the rod 20 of the gas spring 2 being inserted in the cylinder body 10 by a specific amount after the flange member 30 is fastened to the support member 40.

The above described fixing structure 1 of spindle balancer can achieve the following advantages.

The flange member 30 is fixed to the cylinder body 10 of the gas spring 2 so as to protrude horizontally outward from the cylinder body 10 and the flange member 30 has a flat supported surface 30a on the underside. On the other hand, the support member 40 is fixed to the vertically movable spindle head Ma of a machine tool M and the support member 40 has on the top surface a flange receiving surface 40b for receiving the supported surface 30a of the flange member 30. The support member 40 also has a mounting hole 40c in which the cylinder body 10 is fitted in part so that the supported surface 30a abuts against the flange receiving surface 40b and plural fastening members 45 for fastening the flange member 30 to the support member 40 so that the supported surface 30a of the flange member 30 abuts against the flange receiving surface 40b of the support member 40 are provided.

Hence, the spindle balancer B can be supported on the machine tool M in a stable and secure manner and mounted properly in position and orientation in a simple and secure manner, then reducing the workload of mounting the spindle balancer B on a machine tool M, increasing the safety during the mounting, facilitating the setup operation including introduction of the compressed gas 19 in the cylinder body 10 and adjustment of the gas pressure after the spindle balancer B is mounted, and saving the mounting time and setup time of the spindle balancer B.

Furthermore, the support member 40 has plural head housing holes 40e in which the heads 45a of plural fastening members 45 are fitted, respectively so that there is no interference between the plural fastening members 45 and cover plate 50 when the cover plate 50 is attached to the underside of the support member 40 and the cover plate 50 has a through-hole 50a in which the rod 20 is inserted so that there is no interference between the cove plate 50 and rod 20, whereby the cover plate 50 can be attached to the underside of the support member 40 and securely fixed to the support member 40 by plural fixtures 55 and the heads 45a of the fastening members 45 can securely be covered with the cover plate 50. When the operator loosens the plural fastening members 45 by mistake while the rod 20 does not completely protrude from the cylinder body 10 after the gas spring 2 is set up, the flange member 30 may be decoupled from the support member 40 and the gas spring 2 may abruptly extend. Such an event can be prevented, increasing the safety.

Furthermore, the compressed gas 19 can be introduced in the cylinder body 10 with the rod 20 of the gas spring 2 being inserted in the cylinder body 10 by a specific amount after the flange member 30 is fastened to the support member 40. Therefore, the gas spring 2 having a rod 20 of which the reciprocating stroke with regard to the cylinder body 10 is nearly equal to the vertical stroke of the spindle head Ma can be used to ensure the balancer function on the machine tool M. The mounting of the gas spring 2 (spindle balancer B) on the machine tool M and following setup operation can reliably performed and the safety after the setup can be ensured as described above.

The gas spring 2 can be a gas spring having various structures different from the above described structure. With the flange member being provided at the lower end of the cylinder body of the gas spring 2, a fixing structure of spindle balancer having the same effects and advantages as described above can be obtained.

The flange member 30 can be made slightly larger than that above described. In such a case, plural fastening members 45 can be inserted in the flange member 30 from above and screwed to the support member 40. Plural head housing holes 40e are formed in the flange member 30 from above. The heads 45a of the plural fastening members 45 are fitted in these head housing holes 40e. The cover 50 has a through-hole 50a in which the cylinder body 10 is inserted. The cover plate 50 is attached to the top surface of the flange member 30 and fixed by plural fixtures 55 to cover the plural heads 45a.

Modifications of the fixing structure 1 of spindle balancer will be described hereafter. In the following explanation, similar reference numerals will be given to basically the same components of the gas spring mounting structure 1.

Figure 1:
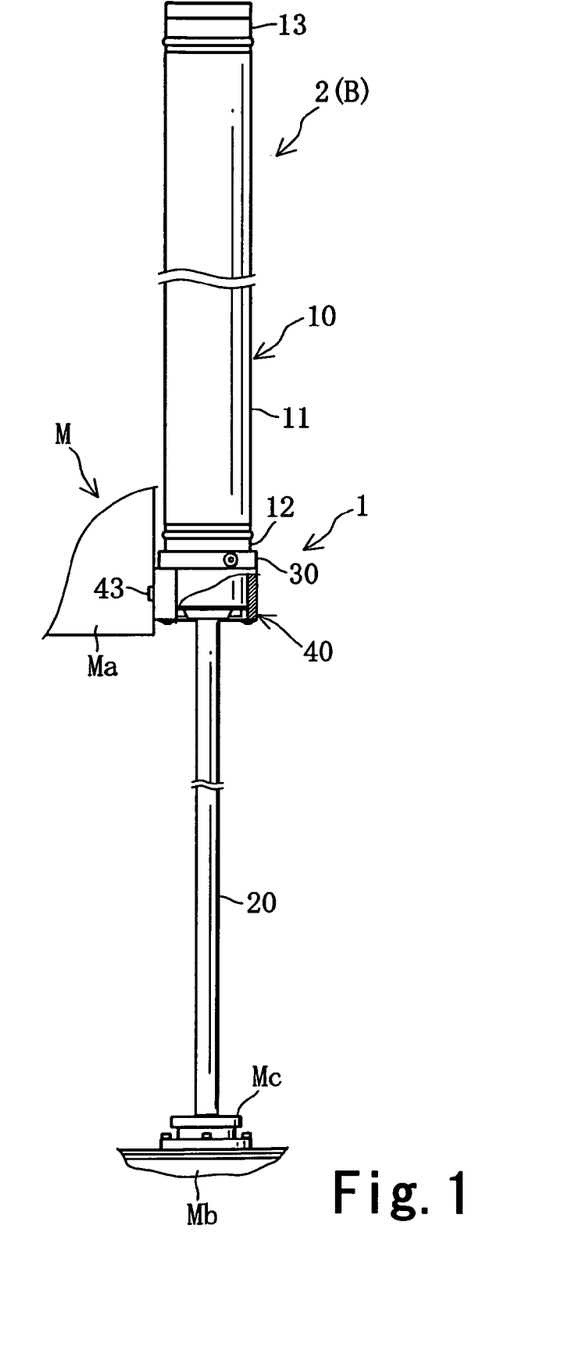
FIG. 1 is a front view of a spindle balancer and its fixing structure of Embodiment 1.
Figure 2:
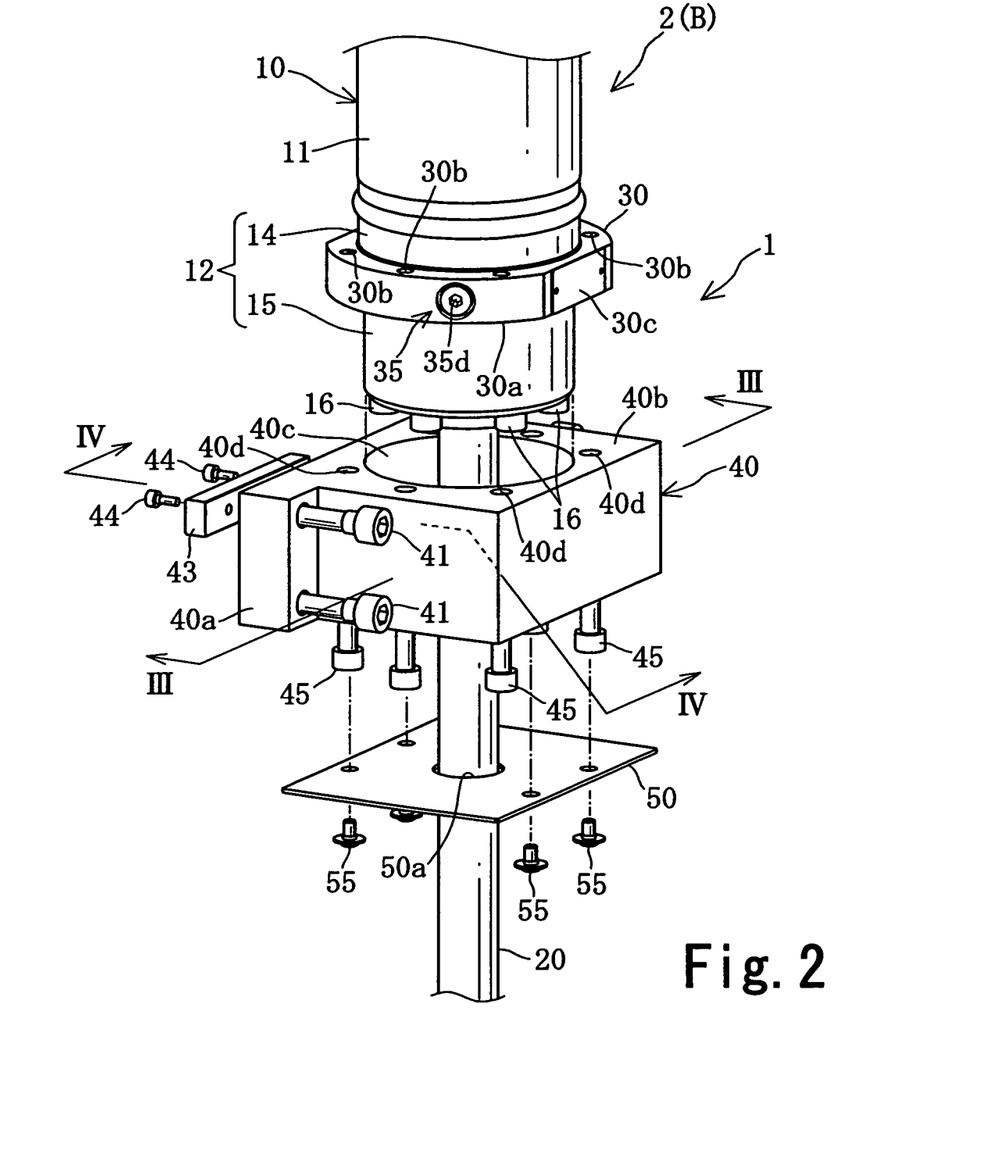
FIG. 2 is an exploded perspective view of the fixing structure of spindle balancer for machine tool.
Figure 3:
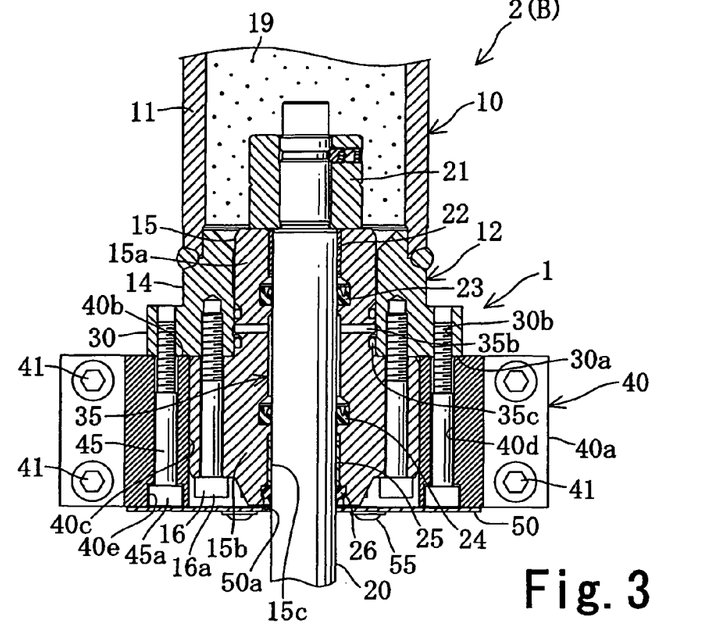
FIG. 3 is a cross-sectional view at the line III-III in FIG. 2.
Figure 4:
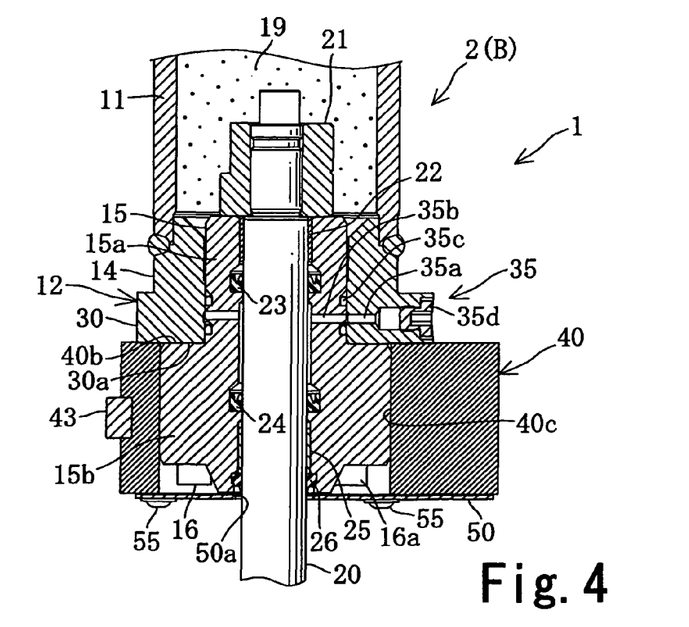
FIG. 4 is a cross-sectional view at the line IV-IV in FIG. 2.
Figure 5:
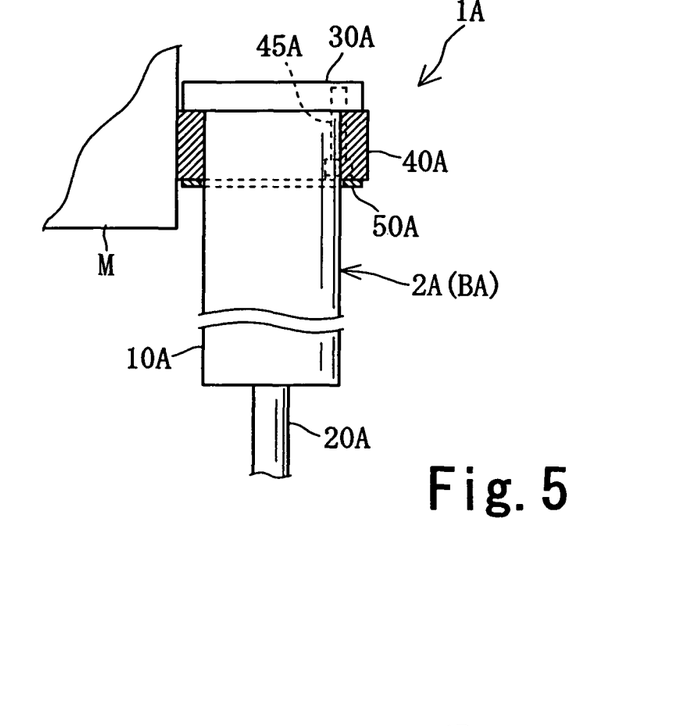
FIG. 5 is a cross-sectional view of the fixing structure of spindle balancer for machine tool of Modification 1.

Modification 1 (see FIG. 5)

A fixing structure 1A of spindle balancer for machine tool is designed to mount the gas spring 2A of a spindle balancer BA with the rod 20A protruding downward from the cylinder body 10A. Fixed to the upper end of the cylinder body 10A, a flange 30A extends horizontally outward from the cylinder body 10A.

A part of the cylinder body 10A that is below the flange 30A is fitted in a support member 40A fixed to the machine tool M (spindle head). The flange member 30A abuts against the support member 40A from above and is fastened thereto by plural fastening members 45A. A cover plate 50A is attached to the underside of the support member 40A and fixed thereto by plural fixtures (not shown). The cylinder body 10A is inserted in the cover plate 50A.

Figure 6:
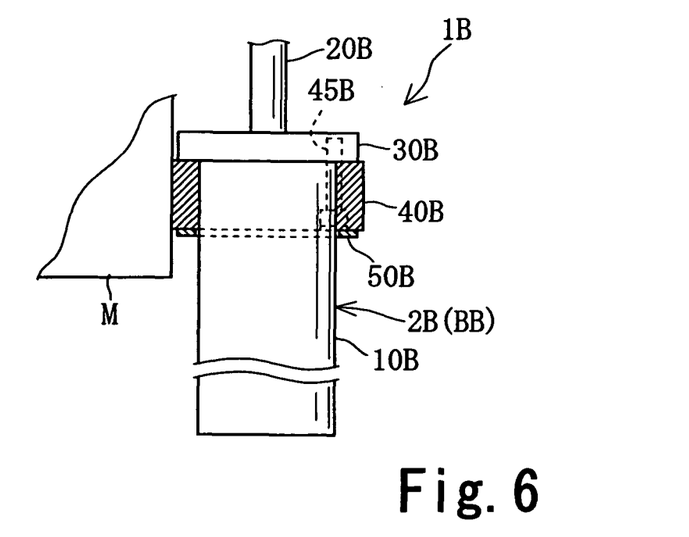
FIG. 6 is a cross-sectional view of the fixing structure of spindle balancer for machine tool of Modification 2.

Modification 2 (see FIG. 6)

A fixing structure 1B of spindle balancer for machine tool is designed to mount the gas spring 2B of a spindle balancer BB with the rod 20B protruding upward from the cylinder body 10B. Fixed to the upper end of the cylinder body 10B, a flange member 30B extends horizontally outward from the cylinder body 10B.

A part of the cylinder body 10B that is below the flange member 30B is fitted in a support member 40B fixed to the machine tool M (spindle head or base). The flange member 30B abuts against the support member 40B from above and is fastened thereto by plural fastening members 45B. A cover plate 50B is attached to the underside of the support member 40B and fixed thereto by plural fixtures (not shown). The cylinder body 10B is inserted in the cover plate 50B.

Figure 7:
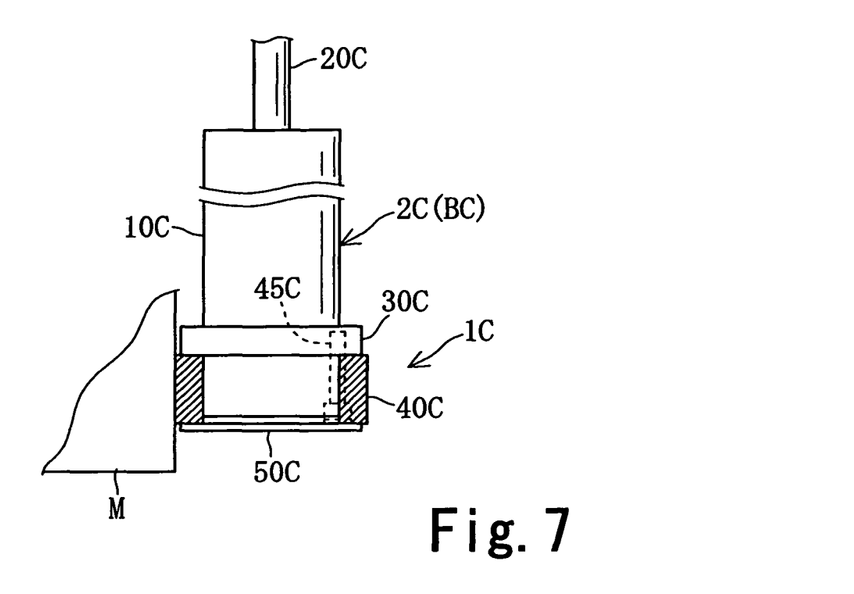
FIG. 7 is a cross-sectional view of the fixing structure of spindle balancer for machine tool of Modification 3.

Modification 3 (see FIG. 7)

A fixing structure 1C of spindle balancer for machine tool is designed to mount the gas spring 2C with the rod 20C protruding upward from the cylinder body 10C. Fixed to the lower end of the cylinder body 10C, a flange member 30C extends horizontally outward from the cylinder body 10C.

The part of the cylinder body 10C that protrudes downward from the flange member 30C is fitted in a support member 40C fixed to the machine tool M (base). The flange member 30C abuts against the support member 40C from above and is fastened thereto by plural fastening members 45C. A cover plate 50C is attached to the underside of the support member 40C and fixed thereto by plural fixtures (not shown). The cylinder body 10C is not inserted in the cover plate 50C.

The fixing structures 1A to 1C of spindle balancer for machine tool of Modifications 1 to 3 achieve basically the same effects and advantages as the above fixing structure 1. The flange member can be provided in the middle of the cylinder body in the longitudinal direction other than the lower and upper ends. The gas spring can have a rod protruding both upward and downward from the cylinder body. Furthermore, the shapes and sizes of the flange member 30, 30A to 30C, support member 40, 40A to 40C (mounting holes 40c), and cover plate 50, 50A to 50C (through-hole 50a) and the numbers and fastening positions of the fastening members 45, 45A to 45C and fixtures 55 can be modified as appropriate.

What is claimed is:

1. A fixing structure of a spindle balancer for a machine tool for mounting the spindle balancer vertically on the machine tool, the spindle balancer comprising a gas spring having a cylinder body, compressed gas introduced in the cylinder body, and a rod inserted in the cylinder body to receive gas pressure of the compressed gas and biasing vertically movable spindle head of the machine tool upward, the fixing structure comprising:

an annular flange member integrally fixed to the cylinder body of the gas spring at a lower end portion of the cylinder body so as to extend horizontally outward from an outer periphery of the cylinder body at an upper end of the lower end portion, the annular flange member having a flat supported surface on an underside;

a support member fixed to a side surface of the spindle head by a plurality of bolts, said support member having on a top surface a flange receiving surface for receiving said flat supported surface, said support member having a mounting hole in which the lower end portion of the cylinder body is fitted in part so as to substantially penetrate said mounting hole to a position at which said flat supported surface of the annular flange member abuts against the flange receiving surface; and a plural fastening members for fastening the annular flange member to the support member so that the flat supported surface abuts against the flange receiving surface.

2. The fixing structure of claim 1, wherein said support member has plural head housing holes in which plural heads of plural fastening members are fitted, respectively, said fixing structure further comprising:

a cover plate attached to an underside of the support member for covering plural heads of said plural fastening members and having a through-hole in which said rod or cylinder body is inserted; and plural fixtures for fixing said cover plate to said support member.

3. The fixing structure of claim 2, wherein the compressed gas is introduced in the cylinder body with the rod of the gas spring being inserted in the cylinder body by a specific amount after said flange is fastened to the support member.

* * * * *